United States Patent
Westlund et al.

(10) Patent No.: US 9,325,428 B2
(45) Date of Patent: Apr. 26, 2016

(54) SAMPLING-BASED BALANCED DETECTION SYSTEM

(75) Inventors: Mathias Westlund, Lerum (SE); Peter Andrekson, Fogelsville, PA (US); Henrik Sunnerud, Landvetter (SE); Mats Skold, Gothenburg (SE)

(73) Assignee: EXFO INC., Quebec (CA)

( * ) Notice: Subject to any disclaimer, the term of this patent is extended or adjusted under 35 U.S.C. 154(b) by 474 days.

(21) Appl. No.: 13/119,220

(22) PCT Filed: Sep. 17, 2009

(86) PCT No.: PCT/US2009/057236
§ 371 (c)(1),
(2), (4) Date: Mar. 16, 2011

(87) PCT Pub. No.: WO2010/033654
PCT Pub. Date: Mar. 25, 2010

(65) Prior Publication Data
US 2011/0182573 A1    Jul. 28, 2011

Related U.S. Application Data (63) Continuation of application No. 12/284,195, filed on Sep. 18, 2008, now abandoned.

(51) Int. Cl.
*H04L 7/00*    (2006.01)
*H04B 10/69*    (2013.01)
*H04B 10/67*    (2013.01)

(52) U.S. Cl.
CPC ............ *H04B 10/697* (2013.01); *H04B 10/677* (2013.01)

(58) Field of Classification Search
None
See application file for complete search history.

(56) References Cited

U.S. PATENT DOCUMENTS 5,481,542 A * 1/1996 Logston et al. ............... 725/131
5,631,553 A * 5/1997 Bose .................. G01R 19/2506
                                                    324/76.23

(Continued)

FOREIGN PATENT DOCUMENTS

CA     2 640 348 A1    7/2008
EP     0244053 A2     11/1987

(Continued)

OTHER PUBLICATIONS

Dekorsky, et al., "High-Speed Asynchronous Optical Sampling for High-Sensitivity Detection of Coherent Phonons", Journal of Physics: Conference Series 92 (2007) 012005.

(Continued)

*Primary Examiner* — Chieh M Fan
*Assistant Examiner* — Wednel Cadeau
(74) *Attorney, Agent, or Firm* — Wendy W. Koba (57) ABSTRACT

A two-gate sampling system has been designed to perform sampled balanced detection of one or more input signal pairs. The present invention performs simultaneous sampling of both signals in each signal pair followed by digitization and combination of the sample pairs using software. By first sampling the signals and then combining the sampled into the corresponding balanced detected signal it is possible to avoid the bandwidth limitations and impedance problems introduced by traditional balanced detectors and electrical oscilloscopes. In particular, for optical sampling gates very high bandwidth sampling gates can be designed without any impedance issues and hence almost perfect balanced detection reconstruction can be performed for very high speed signals. Balanced detection is becoming more and more important as the new phase modulated optical data signals are introduced to the market, such as e.g. PSK, DPSK, QPSK and DQPSK. The present invention is well suited for analysis of these new types of signals.

17 Claims, 6 Drawing Sheets

(56) References Cited

U.S. PATENT DOCUMENTS

| | | | |
|---|---|---|---|
| 6,154,309 A | 11/2000 | Otani et al. | |
| 6,282,007 B1* | 8/2001 | Roberts | G02F 1/3517 398/155 |
| 6,396,606 B1* | 5/2002 | Mao | H04B 10/2569 398/141 |
| 6,509,990 B1 | 1/2003 | Roberts | |
| 6,756,775 B2* | 6/2004 | Jungerman | 324/121 R |
| 7,259,901 B2 | 8/2007 | Parsons et al. | |
| 7,327,302 B2 | 2/2008 | Westlund et al. | |
| 2002/0149780 A1* | 10/2002 | Trinh | G01J 9/0246 356/477 |
| 2005/0185255 A1* | 8/2005 | Doerr | G01J 11/00 359/325 |
| 2007/0188363 A1* | 8/2007 | Westlund | H03M 1/125 341/155 |
| 2008/0164863 A1 | 7/2008 | Bogoni | |
| 2009/0154940 A1* | 6/2009 | Chen et al. | 398/202 |
| 2009/0196619 A1 | 8/2009 | Kim et al. | |
| 2010/0232803 A1* | 9/2010 | Ji | H04B 10/677 398/149 |

FOREIGN PATENT DOCUMENTS

| | | |
|---|---|---|
| EP | 0250683 A1 | 1/1988 |
| WO | WO2009068324 A1 | 6/2009 |

OTHER PUBLICATIONS

Dinu, et al., "Amplitude Sensitivity Limits of Optical Sampling for Optical Performance Monitoring", Jul. 2002/vol. 1, No. 7/Journal of Optical Networking, pp. 237-248.

Bowers et al., "Linear Coherent Receiver Based on a Broadband and Sampling Optical Phase-Locked Loop", DARPA-PHOR-FRONT program under USAF contract No. FA8750-05-C-0265.

Pradarutti et al., "Multichannel Balanced Electro-Optic Detection for Terahertz Imaging", Dec. 24, 2007/vol. 15, No. 26/Optics Express 17652-17660.

Ramaswamy et al., "Optical Phase Demodulation of a 10GHz RF Signal Using Optical Sampling", DARPA-PHOR-FRONT program under USAF contract FA8750-05-C-2065.

Gnauck, A.H. et al; "Optical Phase-Shift-Keyed Transmission"; Journal of Lightwave Technology, IEEE Service Center, New York, NY, US; vol. 23, No. 1, Jan. 1, 2005; pp. 115-130; p. 119, left-hand column; figure 6.

* cited by examiner

FIG. 6

SAMPLING-BASED BALANCED DETECTION SYSTEM

TECHNICAL FIELD

The present invention relates to a sampling arrangement particularly well-suited for analysis of high speed data signals and, more particularly, to a sampling arrangement with two or more coupled sampling gates.

BACKGROUND OF THE INVENTION

Digital sampling is a technique used to visualize a time-varying waveform by capturing quasi-instantaneous snapshots of the waveform via, for example, a sampling gate. The gate is "opened" and "closed" by narrow pulses (strobes) in a pulse train that exhibit a well-defined repetitive behavior such that ultimately all parts of the waveform are sampled. The sampling implementation can either be real-time or equivalent-time, where real-time sampling refers to the case where the sampling rate is higher than twice the highest frequency content of the waveform under test (Nyquist sampling), while equivalent-time sampling uses an arbitrarily low sampling rate. However, equivalent-time sampling requires the measured waveform to be repetitive (in order to provide accurate signal reconstruction)—a fundamental limitation when compared to real-time sampling. The present invention is independent of the sampling rate, and hence, can be either real-time or equivalent-time sampling.

The recent advances in the field of optical communication with new, more complex, data modulation formats as a key technology has created a need for optical waveform characterization tools which are capable of extracting more information from the waveform than simply its power as a function of time.

In particular, many different modulation formats have been developed which use modulation of the phase of the optical carrier to encode the data to be transmitted. A few types of phase modulated signals have already been employed in commercial systems, such as differential phase shift keying (DPSK) and differential quaternary phase shift keying (DQPSK). For these differential modulation formats the data is encoded as the relative phase shift between consecutive symbols. In DPSK modulation schemes, for example, a $\pi$ phase shift between bits represents a logical "1" and a zero phase shift represents a logical "0". For DQPSK modulation, each symbol contains two bits of information by allowing four different relative phase changes between consecutive bits (e.g., 0, $\pi/2$, $\pi$ and $3\pi/2$).

Figure 1:
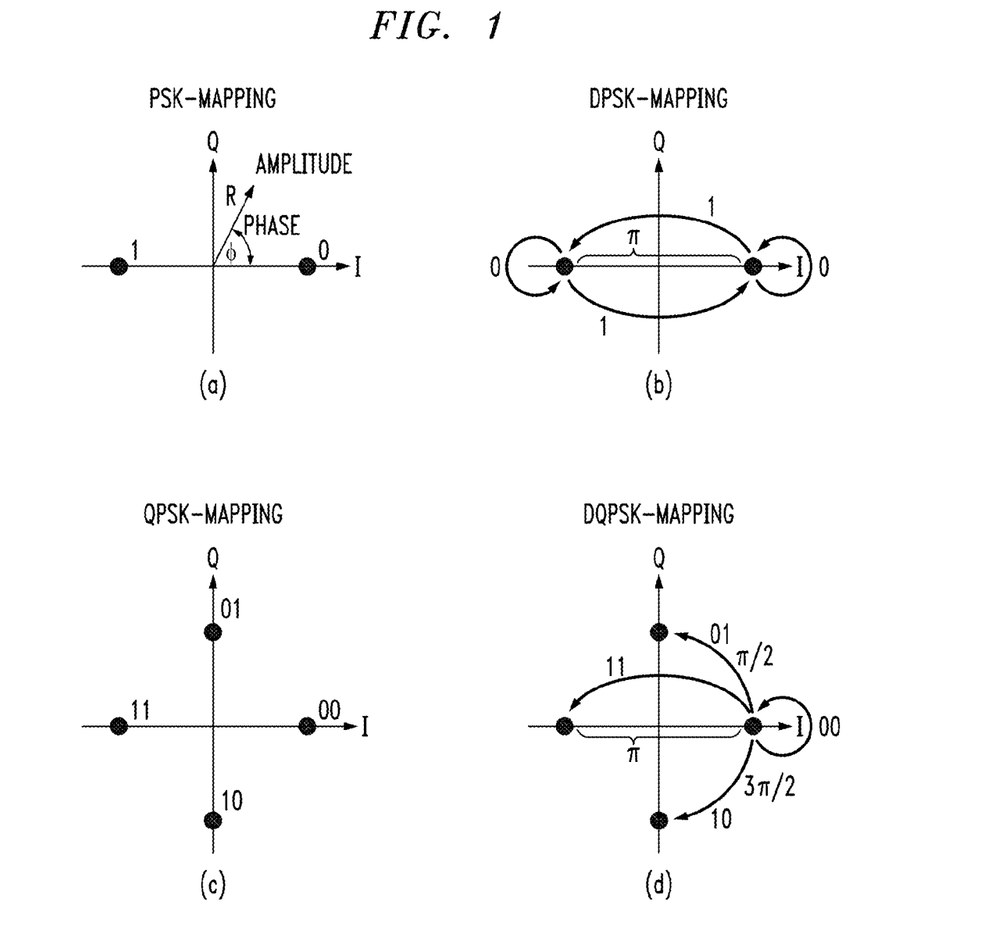
FIG. 1 illustrates the modulation principle of four different phase encoded modulation formats visualized in constellation diagrams containing information about both the amplitude and phase of the optical field.

FIG. 1 is used to further clarify the concept of phase-encoded modulation formats such as phase-shift keying (PSK), differential phase-shift keying (DPSK), and QPSK and DQPSK as defined above. For each type of modulation, the optical phase and amplitude of the data signal are visualized in constellation diagrams showing the optical field amplitude as the radial distance from origin R and the optical field phase as the angle $\phi$. In FIG. 1, the logical marks (ones) and spaces (zeros) are represented as either absolute phase and amplitude levels (for PSK and QPSK formats, FIGS. 1(a) and (b), respectively), or as phase and amplitude transitions for the differentially-coded phase and amplitude levels (for DPSK and DQPSK formats, FIGS. 1(c) and (d), respectively). For D/QPSK each symbol contains, as shown, two bits of information. Therefore, four different logical phase and amplitude combinations are used to represent the "symbols" in either of these modulation format types.

It is to be noted that the amplitude of the data signal is constant for each of these phase-encoded modulation techniques. Hence, if only the power of the incoming signal is "detected" using a conventional photodetector-based o/e conversion device, the phase information will be lost. To extract the phase information, the signal needs to be mixed with an optical reference signal which converts the phase information into amplitude information. For differentially-modulated signals, delay interferometers (DIs), such as Mach-Zehnder interferometers (MZIs), Michelson interferometers, or the like, are commonly used in which the signal itself serves as reference after being delayed one (or more) bit periods. For absolute phase encoded signals (e.g. PSK or QPSK), an independent reference signal is necessary to extract the phase information from each bit.

The DI is an interferometric structure where the incoming optical waveform is split up (preferably equally) into two paths and one path is delayed relative to the second path before recombining the two paths. The relative delay is coarsely set equal to an integer number of bit slots (most commonly one bit slot) and finely tuned to match a particular relative phase delay of the optical carrier. For example, in the DPSK case, the relative delay is a multiple of $\pi$ in order to effectively translate the relative phase shifts between the symbols into a binary amplitude modulated signal. The DI has two output ports—a constructive interference port and a deconstructive interference port (the 'destructive' port outputting the complementary data of the 'constructive' port). In order to optimize a DPSK receiver in terms of signal sensitivity, both outputs from the DI are detected by a so-called "balanced detector" structure.

In order to recover the data embedded in an incoming DQPSK signal, the signal is first evenly split so as to applied as "equal power" inputs into two separate DIs with different relative optical phase delays ($+\pi/4+n*\pi$ and $-\pi/4+m*\pi$, where n and m are integers) and each DI pair of outputs is thereafter detected by a balanced detector structure. By properly choosing the relative phase delays, two bits of information per symbol can be separated and represented as one bit per balanced detector output. The amplitude modulated output from each balanced detector is thereafter sampled (for example, digital sampling) in order to visualize each bit's corresponding eye-diagram.

A major concern when using balanced detection for optical to electrical (o/e) conversion followed by electrical digital sampling is the influence of the measurement system on the measured waveform, which is known to introduce measurement error. In particular, balanced detection and electrical sampling suffer from two major limitations: (1) limited measurement bandwidth (currently <50 GHz); and (2) significant impedance mismatch, resulting in distortion in the measured waveform. For high speed signal characterization (10 GSymbols/s, 40 GSymbols/s or higher), these effects can influence the measurement results to such an extent that the measured waveform is dominated by the measurement system impulse response, which is unacceptable when needing to recover such high speed data signals.

Thus, a need remains in the art for an arrangement capable of characterizing (visualizing) high symbol rate optical signals without being hampered by the measurement system bandwidth or the distortion due to o/e conversion and related impedance matching issues.

SUMMARY OF THE INVENTION

The needs remaining in the prior art are addressed by the present invention, which relates to a sampling arrangement particularly well-suited for analysis of high speed data signals and, more particularly, to a sampling arrangement comprising two or more coupled sampling gates for recovering information from the phase-encoded modulated signals.

In accordance with the present invention, a sampling arrangement utilizes two (or more) separate sampling gates controlled by the same strobe frequency, $f_s$, to acquire samples from two (or more) phase-encoded modulated signals. The lengths of the paths to the sampling gates are adjusted by tunable (or fixed) delay lines so as to enable precise, time-overlapped sampling of all input signals. Precise, temporally-overlapped sampling of all of the input signals is carried out within a time-delay means. Preferably, the time-delay means comprises at least one delay line for adjusting the path length of the propagating optical signal upstream from a corresponding sampling gate. Examples of suitable delay line arrangements include a "fixed" (e.g., factory-adjusted and set) delay line, a "set-and-forget" delay line and a "tunable" delay line.

Alternatively, this time-delay means comprises at least one delay line for adjusting at least one optical or electrical sampling signal generated by the strobe source and conveyed to the corresponding at least one sampling gate. In another embodiment, the time-delay means may comprise a combination of the two aforesaid time-delay means.

In particular, for the application of measuring the output signal pairs of one or more delay interferometers (DIs), as in the case of DPSK and DQPSK signals, the time-delay means is used to ensure that the time delay from the output of each DI to the two corresponding sampling gates are equal to within a fraction of the temporal resolution of the sampling gates. Hence, every pair of samples originating from the two outputs of each DI originates from the same time "slice" of the waveform under test. The acquired pairs of samples are then, after detection and analog-to-digital (A/D) conversion, combined in software to yield samples representing balanced detection of the sample pairs, which then can be displayed on a user interface, or otherwise made available for further analysis.

With this scheme, the need to perform balanced detection in hardware is avoided. In particular, when using optical sampling gates, the sampling gate bandwidth (inversely related to the temporal resolution) can be extremely high and impedance mismatch problems prevalent in electrical sampling applications are no longer an issue, since the sampling takes place in the optical domain.

In one embodiment of the present invention, the two sampling gates are used for more than one input signal pair, such as in the case for a DQPSK signal where after demodulation by two DIs the two output signal pairs are measured in order to present the eye-diagram of each bit in the 2 bits/Symbol DQPSK signal. By including, for example, optical switches before the two sampling gates, the DI output pairs can be measured by the sampling gates by switching in a predetermined fashion.

Another embodiment of the present invention includes a sampling gate to sample an external reference clock, which can be used to establish the time base for the acquired samples from the signal under test.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 2:
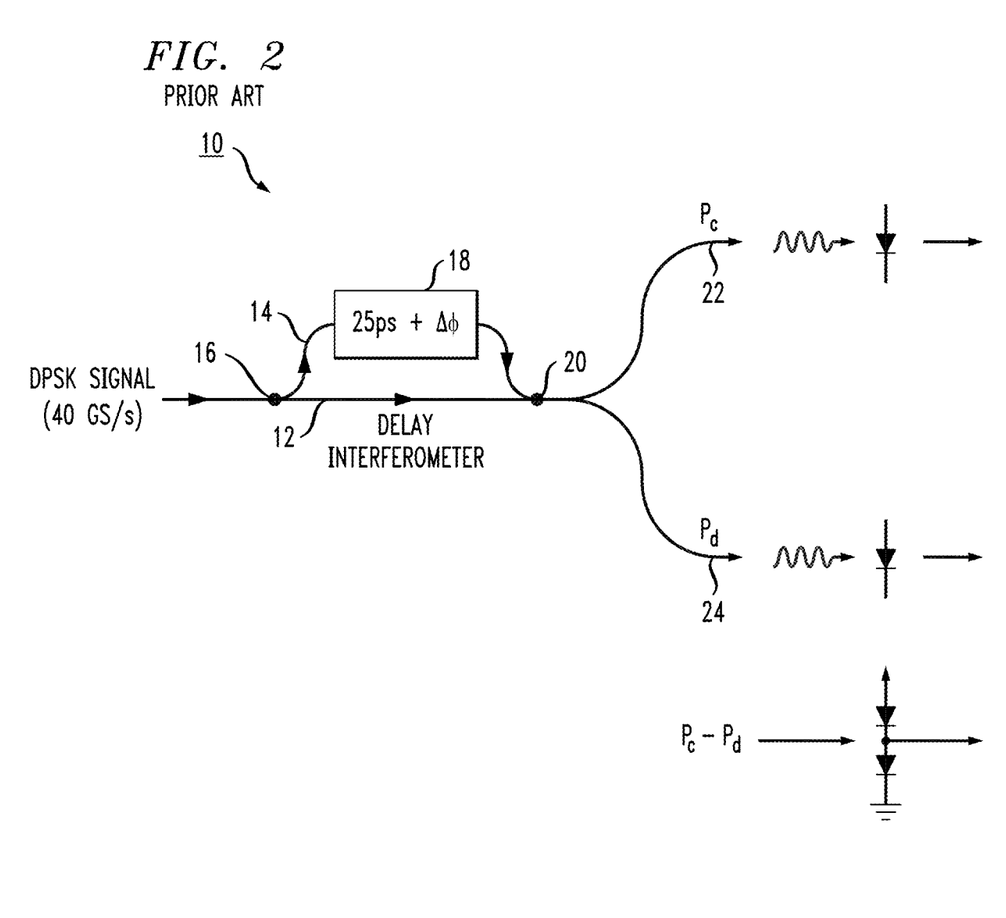
FIG. 2 illustrates a prior art arrangement for demodulating DPSK signals.

Prior to describing the details of the exemplary sampling arrangement of the present invention, a prior art arrangement for demodulating DPSK-encoded signals will be reviewed with reference to FIG. 2. The DPSK signal is demodulated using a delay interferometer (DI) 10 having a relative delay difference between the two interferometer arms. DI 10 is shown as comprising a first signal path 12 and a second path 14. An incoming modulated DPSK signal passes through a splitter 16 such that an approximately equal power level of signal is directed into paths 12 and 14. Second path 14 includes a delay element 18, represented as a fixed amount of delay (25 ps in this example) and a variable amount of delay shown as $\Delta\phi$). The phase shift is selected such that a delay of an integer number of bits (generally a single bit) is obtained. The original and the phase-shifted versions of the DPSK-encoded signal are thereafter recombined in a signal combiner 20 and split along two separate output paths 22 and 24. As with splitter 16, the output signals along paths 22 and 24 comprise half of the power of the combined original/phase-shifted signals.

At the two outputs from DI 10, the phase information in the DPSK signal is converted into two amplitude modulated signal, a first "constructive interference" signal with power $P_c$ along a first output path 22, and a second "destructive interference" signal (exhibiting the complementary information) at power $P_d$ along a second output path 24

With traditional techniques, these two output signals would be applied as inputs to a balanced opto-electronic detector, which would subtract the one signal from the other and convert the difference into the electronic domain, ideally providing an electrical signal representing $P_c-P_d$. In the prior art arrangement of FIG. 2, a pair of photodiodes 21 and 23 are used to provide this opto-electronic conversion. However, such o/e conversion techniques are limited in bandwidth and quality of impulse response. As a result, the electrical signal created after detection does not represent the ideal case, in particular for high speed signals.

In contrast, the present invention utilizes a sampling technique to individually measure the waveform on each DI output, in a manner to be described in detail hereinbelow. A software-embedded algorithm is then used to combine the samples in a manner which emulates the operation of an ideal balanced detector, performing the operation $P_c$-$P_d$, to create a sampled output waveform as shown in eye diagram 34 of FIG. 3. For input signals other than DPSK (such as DQPSK), similar reasoning applies but instead of having only two output signals after a single DI, there can be more DI's each having two output signals which can be taken care of by embodiments of the present invention to be described below.

In a preferred embodiment of the present invention, the sampling of the two DI output signals is performed in the optical domain, so as to completely remove the influence of the bandwidth limitations inherent in optical-electronic conversion and provide a final result which can be very close to the targeted ideal result $P_c$-$P_d$. However, the sampling technique of the present invention is not limited to the optical domain; electrical sampling techniques may be used in suitable applications (for example, lower speed applications).

Figure 3:
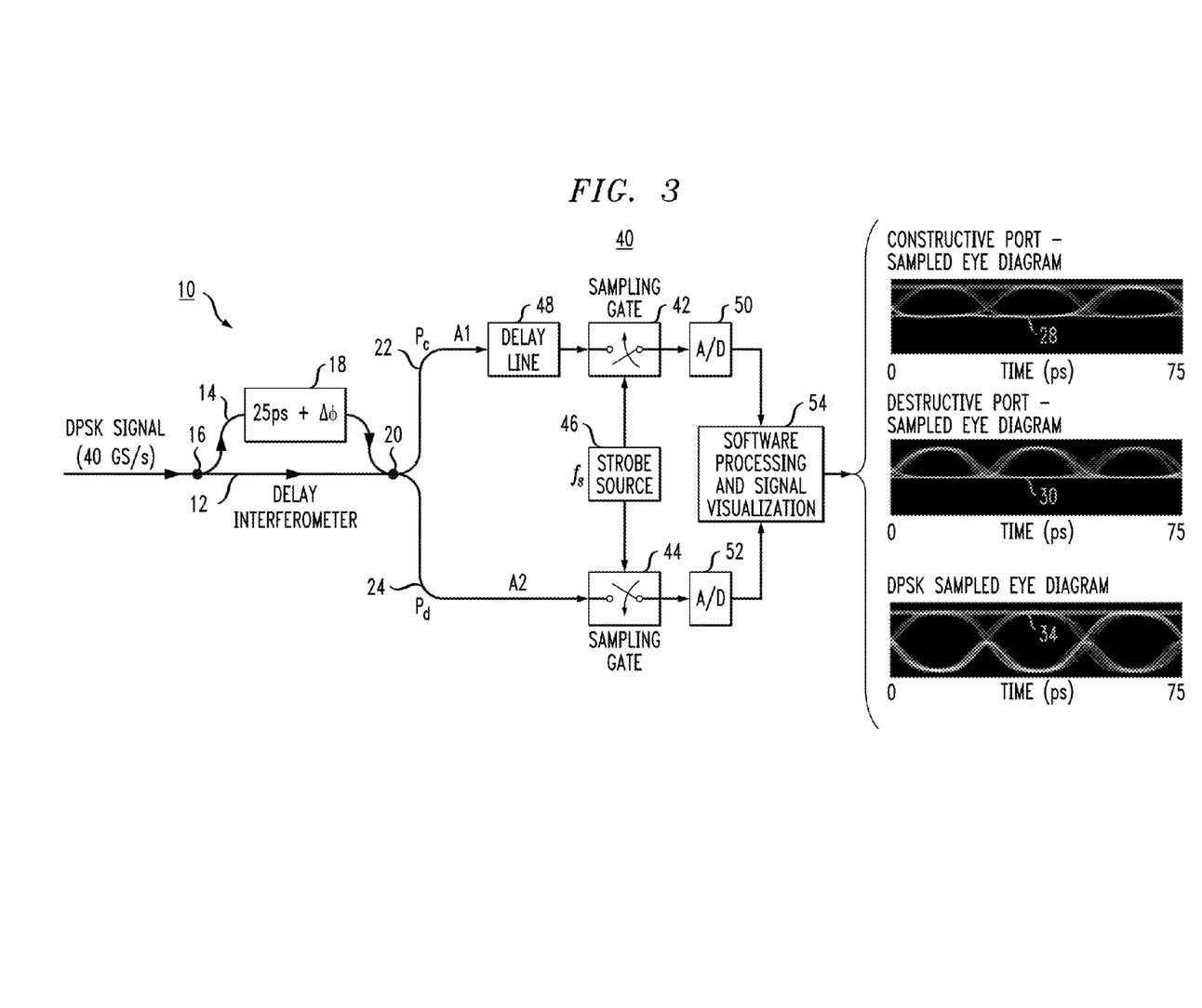
FIG. 3 shows an embodiment of the present invention for performing sampling in a demodulated DPSK signal, and also illustrates measured eye-diagrams of a demodulated 40 GSymbol/s DPSK signal using this embodiment of the present invention.

FIG. 3 shows an embodiment of the present invention which utilizes the same incoming DPSK-encoded signal and demodulating arrangement including DI 10 as described above in association with FIG. 2. The embodiment of FIG. 3 may also be utilized if only one bit in a two-bits-per-symbol DQPSK signal is sampled. As will be described in detail below, a sampling arrangement 40 formed in accordance with the present invention is used in place of prior art o/e conversion arrangements to more accurately recover the data from the phase-encoded incoming signal. The "constructive" signal propagating along first output path 22 is shown as applied as an input to first signal port A1 of arrangement 40. Similarly, the "destructive" signal propagating along second output path 24 is applied as an input to second signal port A2.

It is to be understood that the technique of the present invention can be scaled to support a larger number of input ports, as will be discussed in detail below. Moreover, the input signals can be either optical or electrical. In its most general form, the present invention is a combination of performing sampling of pairs of input signals in hardware and using software algorithms to combine the created samples into a single output corresponding to balanced detection of the input signal pairs.

Referring back to the particular embodiment of FIG. 3, such a result is shown as the simultaneous sampling of A1 and A2 and subsequent reconstruction of a sampled version of the power of A1-A2. At the core of the present invention are a pair of sampling gates 42 and 44 which are opened and closed by sampling signals, characterized by a sampling frequency $f_s$, generated by a common strobe source 46. The sampling signals may be either in the electrical domain or in the optical domain, depending on the domain of the signals arriving at ports A1 and A2. However, the full benefits of this invention are most apparent when the signals to be tested are optical, in which case optical sampling is the preferred embodiment in order to eliminate all high speed electronics and o/c conversion. By digitally sampling the output waveform from the balanced detector structure, the corresponding electrical eye-diagram, showing logical binary amplitude levels corresponding to the phase transitions in the DPSK signal, can be visualized.

Optical sampling gates 42 and 44 may comprise any one of a wide variety of implementations using different nonlinear optical processes to create the gating functionality. Exemplary suitable components include, but are not limited to, four-wave mixing in fiber, sum-frequency generation in optical crystals and cross-phase modulation in fiber or semiconductor optical amplifiers. While strobe source 46 is illustrated as a single element, it is to be understood that separate strobe sources, having the same sampling frequency $f_s$ may also be used, with each separate strobe source used to control a separate gate.

It should be noted that many sample gate types are polarization sensitive, that is, the efficiency of the sampling may be related to the state of polarization (SOP) of the light entering the sampling gate, and this efficiency may even be substantially "zero" for certain input SOPs. In particular, sampling gates based on four-wave mixing are particularly sensitive to the state of polarization. Consequently, if standard (i.e., non-polarization-maintaining) single-mode optical fiber is used throughout the apparatus, it may be desirable to insert polarization control means in each of optical signal paths 22 and 24 to optimize the SOP of the signals entering the associated sampling gates.

Alternatively, an arrangement described in commonly-owned U.S. Pat. No. 7,199,870 entitled "Polarization Independent Optical Sampling Arrangement", issued Apr. 3, 2007, may be implemented to render the design polarization independent.

Alternatively, the fiber and all other optical components of the present invention may be polarization maintaining, with a polarization controller disposed before the input to a polarization-maintaining input fiber, upstream with respect to DI 10, in order to optimize the light launched along one of the axes (e.g., a slow axis) of the PMF.

Figure 5:
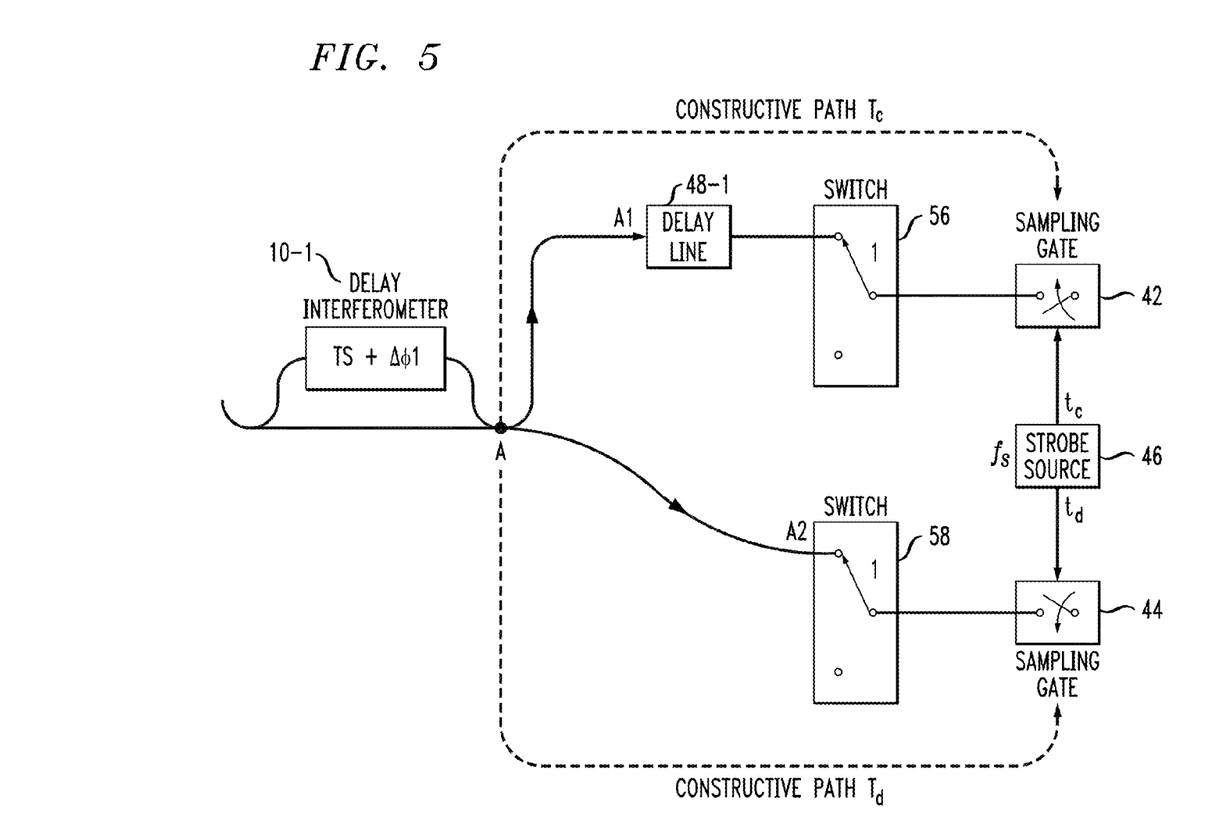
FIG. 5 illustrates a timing condition associated with the arrangement of FIG. 4.

A key design parameter for the present invention is to facilitate alignment of the sampling times of gates 42 and 44 via strobe source 46 such that the two parts of the signal are synchronously sampled in order for combination in the software to be accurate. A delay line 48 is disposed at first input port A1 and is used to adjust the distance (or time delay) from the input A1 to sampling gate 42, thereby adjusting the sampling time of gate 42 relative to the sampling time of gate 44. FIG. 5 will describe an example which highlights the condition for adjusting delay line 48, In general, the operation of delay line 48 can be either adjustable or fixed, depending on the measurement application.

The output samples from the sampling gates 42 and 44 are digitized by analog-to-digital converters (A/D) 50 and 52, respectively, and subsequently fed into a software processing and signal visualization system 54. The main functionality of system 54 related to the present invention is to combine the acquired sample pairs for each measurement in order to provide balanced detection functionality. Furthermore, the software can be used to visualize each measured input signal pair as the corresponding balanced detected signal. Eye diagram 28 of FIG. 3 is the sampled output associated with the constructive port, eye diagram 30 is the sampled output associated with the destructive port and, most importantly, eye diagram 34 is the resultant DPSK sampled information eye diagram, where each of these diagrams was created by system 54.

An alternative embodiment of the present invention allows for detection of the output samples from the sampling gates 42 and 44 using low bandwidth balanced receivers in order to perform the balanced detection in the hardware before digitizing the samples in an A/D converter.

It is to be understood that the present invention is independent of the particular method utilized to time stamp each sample. In particular, the technique of the present invention has been found to work for both real-time sampling and equivalent-time sampling, irrespective of the time-base design used for equivalent-time sampling.

Figure 4:
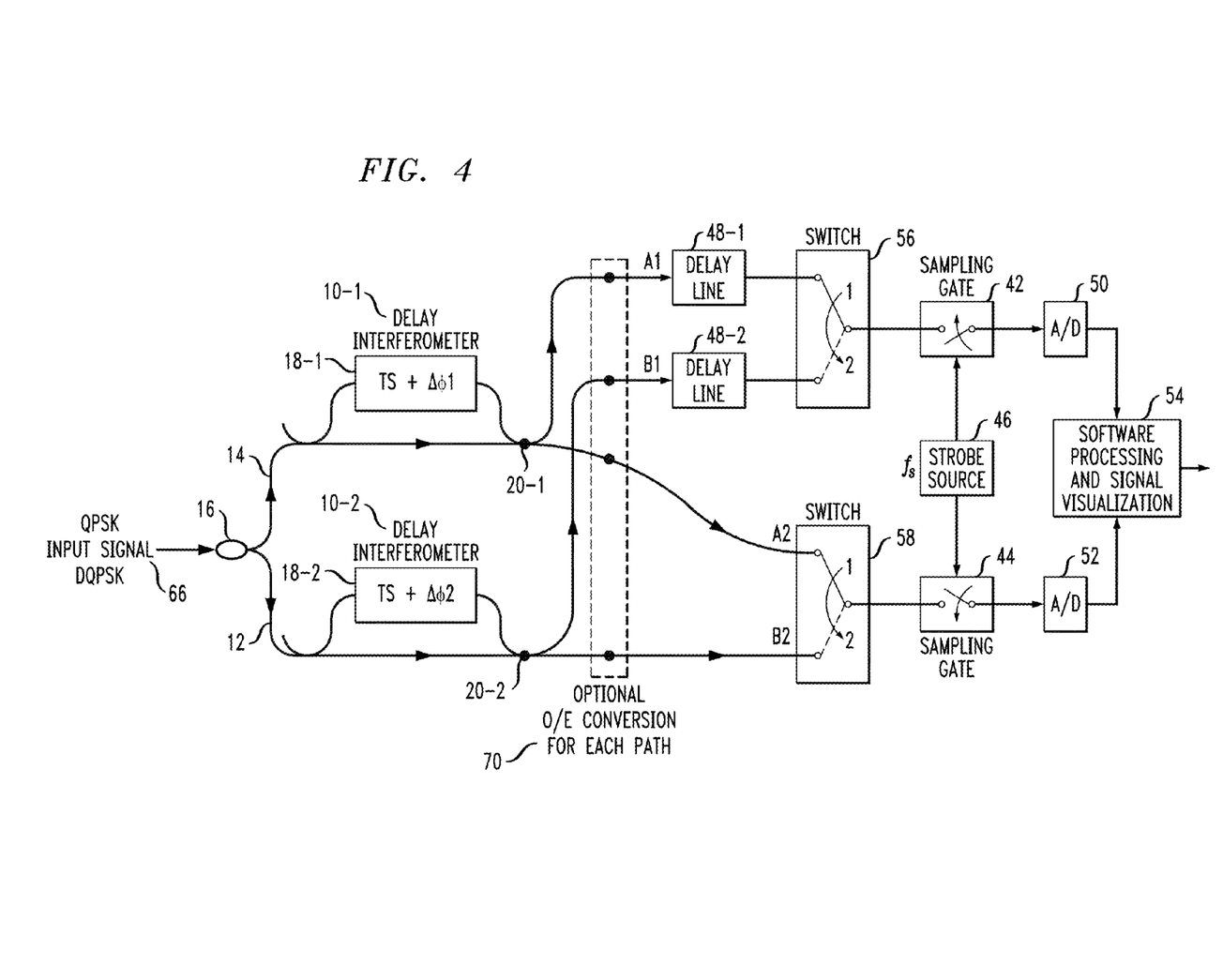
FIG. 4 shows the embodiment of the present invention from FIG. 3 with a typical signal DI demodulation setup in front of the four input ports of the present invention.

FIG. 4 illustrates an embodiment suitable for measurement of, for example, QPSK or DQPSK signals, which requires the generation of two sample pairs for proper demodulation. As before, the incoming phase-encoded signal is split along signal paths 12 and 14 by a power splitter 16. In this case, however, the portion of the signal propagating along signal path 14 is thereafter applied as an input to a first DI 10-1, and the remaining portion propagating along signal path 12 is applied as an input to a second DI 10-2, as shown in FIG. 4. Each DI 10 includes a separate delay element 18, illustrated as delay element 18-1 (associated with DI 10-1) and delay element 18-2 (associated with DIO 10-2). Delay elements 18-1 and 18-2 are shown as exhibiting the appropriate bit delays TS and phase relations $\Delta\phi1$ and $\Delta\phi2$ for demodulation of the input signal. In particular, for the case of DQPSK the phase relations can be, for example, $\Delta\phi1=+\pi/4$ and $\Delta\phi2=-\pi/4$, in order to separate each bit in the 2 bits/Symbol DQPSK data signal. By flipping the switches 56 and 58 in a predetermined manner, the outputs from each DI 10-1 and 10-2 can be measured separately, and with the present invention the corresponding balanced detected signals of each demodulated bit of the DQPSK signal can be visualized.

In this case, a set of four output signals have been created, a first signal pair A1 and A2 from DI 10-1 (similar to the embodiment of FIG. 3, as discussed above) and a second signal pair B1 and B2, from DI 10-2. In order to most efficiently utilize the elements of sampling arrangement 40, switches 56 and 58 are positioned at the entrance ports of arrangement 40, in front of sampling gates 42 and 44, in order to facilitate alternating sampling of the input signal pairs from DI's 10-1 and 10-2, that is, first A1, A2 and then B1, B2. As shown, a second delay line 48-2, associated with input B1 is included in the arrangement to provide the same synchronization activity as delay line 48 defined above and discussed in detail below.

FIG. 4 also points out that o/e conversion of the signals can be performed before the sampling takes place. In this case, a photodiode or other o/e conversion element is disposed along each signal path, and is collectively illustrated as conversion component 70 in FIG. 4. In this case, sampling gates 42 and 44 will comprise electronic sampling gates. The positioning of o/e conversion component 70 is flexible and can be either directly after DIs 10-1 and 10-2, or at any other point in front of sampling gates 42 and 44. Additionally, delay lines 48-1 and 48-2, as well as switches 56 and 58 can be either electrical or optical.

FIG. 5 illustrates the critical timing required between sampling gates 42 and 44 in order to sample each part of the generated signal pairs at the correct matching times. FIG. 5 is an extracted part of the embodiment of FIG. 4. In FIG. 5, the signal is not split up until point A, corresponding to the output of the DI 10-1. From this point on, it is critical that the difference in effective optical path length (i.e., time difference) from point A to the point where the signal is sampled be very close to equal in order to generate samples originating from the same time in the original signal. This is a condition in order to be able to combine the two samples in the software and emulate the balanced detection.

The timing condition can be expressed using the notations in FIG. 5 as $|(T_c-t_c)-(T_d-t_d)|<\Delta\tau$, where $T_c$ is the propagation time for the "constructive" signal from point A to sampling gate 42, $t_c$ is the propagation time for the sampling strobe pulse from strobe source 46 to sampling gate 42, $T_d$ is the propagation time for the "destructive" signal from point A to sampling gate 44, $t_d$ is the propagation time for the sampling strobe pulse from strobe source 46 to sampling gate 44, and $\Delta\tau$ represents the temporal resolution of sampling gates 42 and 44. As alluded to above, delay line 48-1 plays a critical role to facilitate the fulfillment of this timing condition, in particular since the relative lengths of the output fibers corresponding to the "constructive" and "destructive" ports of commercially available delay interferometers are usually not accurately controlled or known. However, with precise control of this and every other component within sampling arrangement 40, delay line 48 may be omitted, in particular for low-bandwidth sampling gate solutions with high (i.e., poor) $\Delta\tau$. The timing condition applies to all input signal pairs within the system of the present invention (e.g., in the arrangement of FIG. 4, a similar condition applies from point B to sampling gates 42 and 44).

Figure 6:
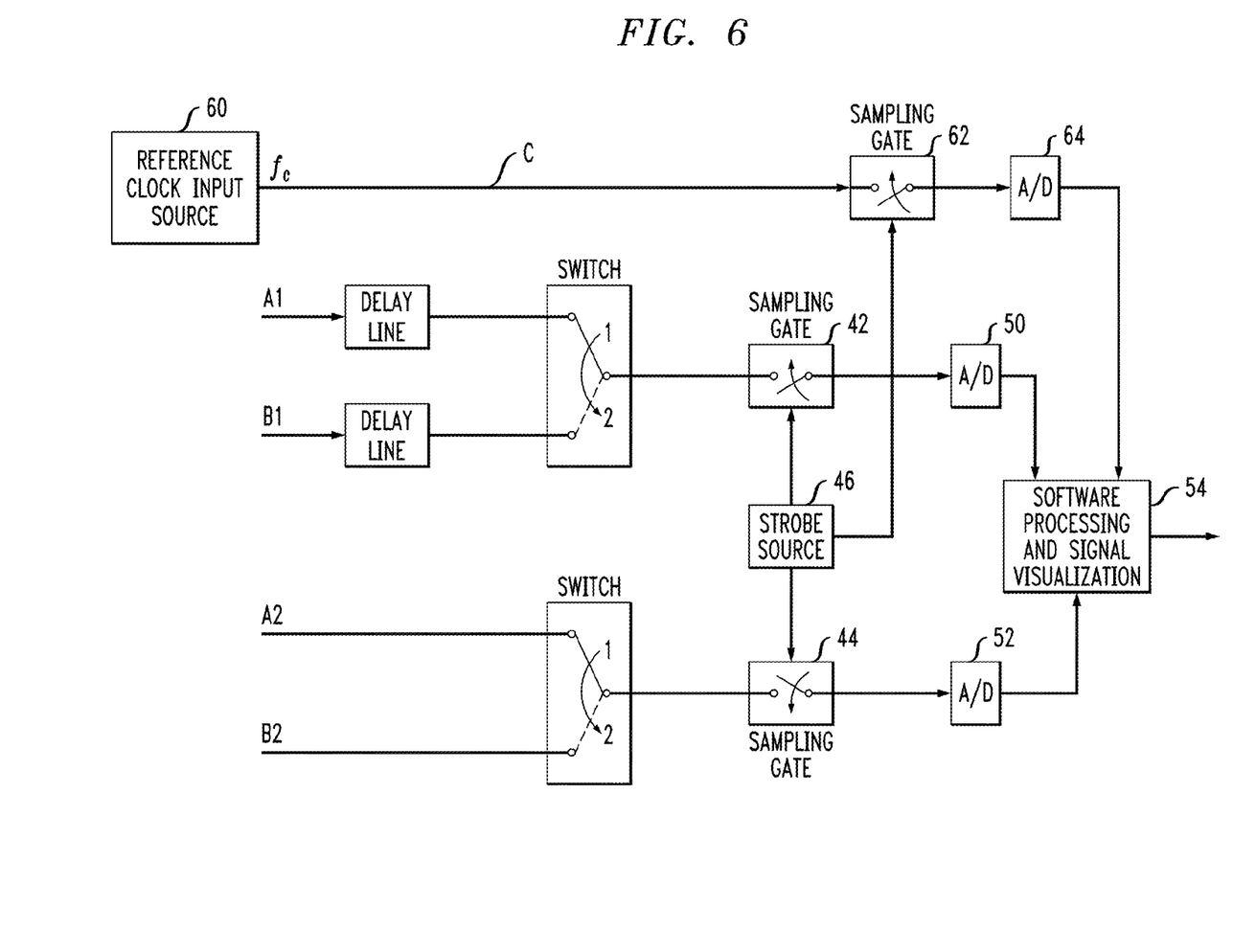
FIG. 6 illustrates an embodiment of the present invention using an external reference clock to synchronize the acquired samples.

It has been pointed out that the present invention is independent on the time-base design used to synchronize the acquired samples into a replica of the original signal. However, it should be noted that the present invention is compatible with U.S. Pat. No. 7,327,302, by M. Westlund et al. on Feb. 5, 2008, assigned to the assignee of this application and hereby incorporated by reference. FIG. 6 illustrates an embodiment of the present invention where an external reference signal source 60 is used to supply a gating control signal for the system, where the frequency $f_c$ of reference clock signal C is directly related to the frequency of the demodulated signals appearing at ports A1, A2, B1 and B2. As shown, the reference clock output signal C from source 60 is sampled by a separate sampling gate 62, using the same strobe source 46. The generated clock samples are then digitized by an A/D converter 64 and applied as an input to software processing system 54. With this input information, the timebase of the external clock can be determined by the embedded software algorithms. Since the frequency $f_c$ of the external clock is directly related to the frequency of the input signal bit rate, the time-base of the external clock can be directly transferred to the recovered output signal.

It is to be understood that other advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the claims appended hereto.

What is claimed is:

1. A sampling arrangement for performing balanced detection of a pair of input optical data signals from an original phase-encoded modulated optical data signal, the sampling arrangement comprising a delay interferometer responsive to the original phase-encoded modulated optical signal and providing a pair of apportioned input optical data signals at a common point of the delay interferometer output, the input optical data signals consisting of a constructive-interference optical signal and a destructive-interference optical signal;

at least one pair of sampling gates, a first sampling gate of said pair responsive to the constructive-interference optical signal of the pair of input optical data signals and a second sampling gate of said pair responsive to the destructive-interference optical signal of the pair of input optical data signals, each sampling gate opened and closed by a control signal applied as separate input thereto for creating as an output a stream of optical samples representative of the respective input data signal applied thereto;

a strobe source for generating a sampling signal applied as the control signal input to each sampling gate, the sampling signal operable to provide sampling by controlling the at least one pair of sampling gates to synchronously open and close at a predetermined sampling frequency $f_s$;

at least one adjustable delay means associated with said at least one pair of sampling gates, said at least one adjustable delay means configured to ensure that said at least one pair of sampling gates generates samples originating from the same point in time in said original data signal as arriving at the common point; and at least one A/D converter to convert a detected version of the streams of samples into a digital representation thereof;

a software processing and signal visualization system configured to provide a visual representation of the waveform of said pair of input data signals.

2. A sampling arrangement as defined in claim 1, wherein the at least one adjustable delay means comprises at least one adjustable delay line for minimizing differences in path lengths between each input data signal and each associated sampling gate.

3. A sampling arrangement as defined in claim 1, wherein the efficiency with which the stream of samples is created by each sampling gate is dependent upon and controlled by the state of polarization (SOP) of respective said input optical data signals.

4. A sampling arrangement as defined in claim 1 wherein the at least one pair of sampling gates comprises sampling gates responsive to an electrical sampling signal, the strobe source being operable to provide the electrical sampling signal.

5. A sampling arrangement as defined in claim 1 wherein the at least one pair of sampling gates comprises sampling gates responsive to an optical sampling signal, the strobe source being operable to provide the optical sampling signal and the state of polarization (SOP) of each sampling signal being disposed to provide relatively high sampling efficiency at each sampling gate.

6. A sampling arrangement as defined in claim 1 wherein the strobe source comprises a pair of strobe elements operating synchronously and at the same frequency, each separate strobe element coupled to control at least one respective sampling gate.

7. A sampling arrangement as defined in claim 1 wherein the balanced detection of each sampled pair is performed by
using an optical-to-electrical balanced receiver having two optical inputs, S1 and S2, and an electrical output corresponding to S1-S2;
said A/D converter coupled to the output of the balanced receiver to convert an analog set of samples into a digital representation thereof.

8. A sampling arrangement as defined in claim 1 wherein the balanced detection of each sampled pair is performed by
detecting the first and second component of each sampled pair with separate optical-to-electrical receivers;
each component of the sampled pair are coupled to one of said A/D converter to convert the analog sets of samples into digital representations thereof;
the digitally represented pairs of sampled outputs are then subtracted on a sample by sample basis to form the reconstructed balanced detected signal.

9. A sampling arrangement as defined in claim 1 wherein the adjustable delay means is selected from the group consisting of: set-and-forget delay means and tunable delay means.

10. A sampling arrangement as defined in claim 1 wherein
a single pair of optical sampling gates is responsive to a single pair of optical input data signals to form a sampled pair of signals;
a single optical strobe source controls the single pair of optical sampling gates at a predetermined frequency;
an adjustable optical delay means is disposed in either or both of the input data signal pair and the sampling signal pair to control the input data signal pair paths differences to each sampling gate; and
the output sampled signals from the single pair of optical sampling gates are converted to electrical signals using separate optical-to-electrical receivers followed by A/D conversion of each signal, wherein the digitally represented signals are then subtracted to form the balanced detected version of the pair of input data signals.

11. A sampling arrangement as defined in claim 1 wherein there are detected at least two of said pair of input optical data signals which are apportioned, using a air of delay interferometers, and wherein
a single pair of optical sampling gates is responsive to the two pairs of optical input data signals to form sampled pairs of signals;
a single optical strobe source controls the pairs of optical sampling gates at a predetermined frequency, the sampling arrangement further comprising:
optical switches disposed in the input signal paths before each sampling gate associated with two or more inputs and a single output and controlled such that the optical switches select, in a predetermined order, which pair of input data signals is sent to the sampling gates; and
adjustable optical delay means disposed along each input signal path to control the input data signal pair paths differences to each sampling gate, wherein
the output sampled signals after the two sampling gates are converted to electrical signals using separate optical-to-electrical receivers followed by A/D conversion of each signal such that the digitally represented signals are then subtracted to form the balanced detected version of the input data signal pairs.

12. A sampling arrangement as defined in claim 1 wherein the arrangement further comprises
at least one additional sampling gate responsive to at least one input reference clock signals to form sampled reference clock signals wherein the at least one additional sampling gate is controlled by the same strobe source as the sampling gates responsive to the input data signal pairs; where
the output sampled references clocks after the sampling gates are converted to electrical clock signals using separate optical-to-electrical receivers followed by A/D conversion of each clock signal such that the digitally represented clock signals are used to create time-bases for the sampled signals to correctly position each sample in the reconstructed balanced detected version of the input data signal pairs.

13. A sampling arrangement as defined in claim 1 wherein the arrangement further comprises
a demodulator disposed at the input of the arrangement for use with optical signals containing data encoded in the optical phase, wherein after demodulation the input optical data signal is split up into a number of input data signal pairs containing the optical phase information converted into the form of amplitude modulation.

14. A sampling arrangement as defined in claim 13 wherein the demodulator is configured to demodulate modulation formats selected from the group comprising differential phase-shift keying (DPSK), differential quadrature phase-shift keying (DQPSK), phase-shift keying (PSK), quadrature phase-shift keying (QPSK) or differential eight-level phase-shift keying (D8PSK).

15. A sampling arrangement as defined in claim 3 wherein the at least one pair of sampling gates comprises sampling gates responsive to an optical sampling signal with the strobe source being operable to provide the optical sampling signal.

16. A sampling arrangement as defined in claim 8 wherein the adjustable delay means is selected from the group consisting of: optical delay means and electrical delay means.

17. A sampling arrangement for performing balanced detection of two pairs of input optical data signals from a pair of original phase-encoded modulated optical data signals, the sampling arrangement comprising:
- A pair of delay interferometers, each delay interferometer responsive to separate one of the pair of original phase-encoded modulated optical data signals and providing an associated pair of apportioned input optical data signals at a common point of the output of the associated delay interferometer, the associated pair of apportioned input optical data signals consisting of a constructive-interference optical signal and a destructive-interference optical signal
- two pairs of optical sampling gates are responsive to the two pairs of optical input data signals to form two sampled pairs of signals, each pair of sampling gates including a first sampling gate of said pair responsive to the constructive-interference optical signal of the pair of optical data signals and a second sampling gate of said pair responsive to the destructive-interference optical signal of the pair of input optical data signals, each sampling gate opened and closed by a control signal applied as a separate input thereto for creating as an output a stream of optical samples representative of the respective input data signal applied thereto;
- a single optical strobe source for generating a sampling signal applied as the control signal input to controls the two pairs of optical sampling gates, the sampling signal operable to provide sampling by controlling the two pairs of optical sampling gates to synchronously open and close at a predetermined frequency;
- a separate adjustable optical delay means associated with each pair of sampling gates, said adjustable optical delay means configured to ensure that the associated pair of sampling gates generates samples originating from the same point in time in said original data signal at the common point; and
- the output sampled signals after each pair of sampling gates being converted to electrical signals using separate optical-to-electrical receivers followed by A/D conversion of each signal wherein the digitally represented signals are then subtracted to form balanced detected version of both pairs of input data signals.

* * * * *